United States Patent [19]

Young

[11] 3,966,305
[45] June 29, 1976

[54] LIQUID CRYSTAL CELL WITH IMPROVED ALIGNMENT

[75] Inventor: Robert A. Young, San Jose, Calif.

[73] Assignee: American Micro-Systems, Inc., Santa Clara, Calif.

[22] Filed: Oct. 10, 1974

[21] Appl. No.: 513,580

[52] U.S. Cl. .......................... 350/160 LC
[51] Int. Cl.² ............................. G02F 1/13
[58] Field of Search ...................... 350/160 LC

[56] References Cited
UNITED STATES PATENTS

| | | | |
|---|---|---|---|
| 3,612,654 | 10/1971 | Klein et al. | 350/160 LC |
| 3,809,456 | 5/1974 | Goldmacher | 350/160 LC |
| 3,912,366 | 10/1975 | Sprokel | 350/160 LC |
| 3,932,026 | 1/1976 | Sprokel | 350/160 LC |

OTHER PUBLICATIONS

Gladstone et al., IBM Tech. Discl. Bulletin, vol. 14, No. 5, Oct., 1971, pp. 472-473.

DuBois et al., Applid Physics Letters, vol. 24, No. 7, Apr. 1, 1974, p. 297.

*Primary Examiner*—Robert J. Webster
*Attorney, Agent, or Firm*—Owen, Wickersham & Erickson

[57] ABSTRACT

In a liquid crystal display device the homogeneous alignment of twisted nematic liquid crystal molecules is accomplished by providing a first thin dielectric layer on the inner surfaces of each of the spaced apart glass plates covering complementary patterns of transparent electrode material. Applied to the dielectric layer on each plate is a second thin film of aligning material such as silicon monoxide. The first dielectric layer provides maximum isolation to the liquid crystal material and a uniform layer for subsequent application of the aligning film.

4 Claims, 2 Drawing Figures

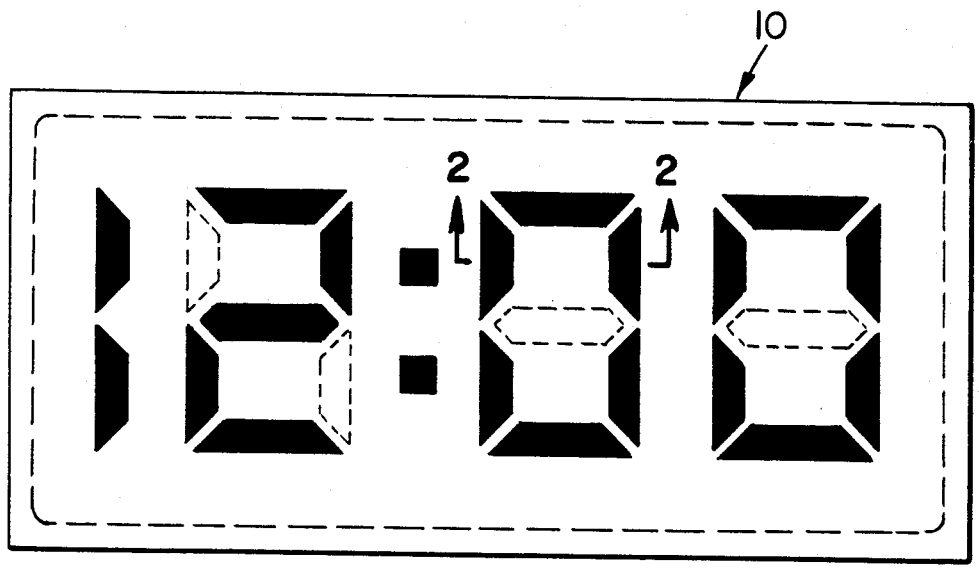
FIG_1
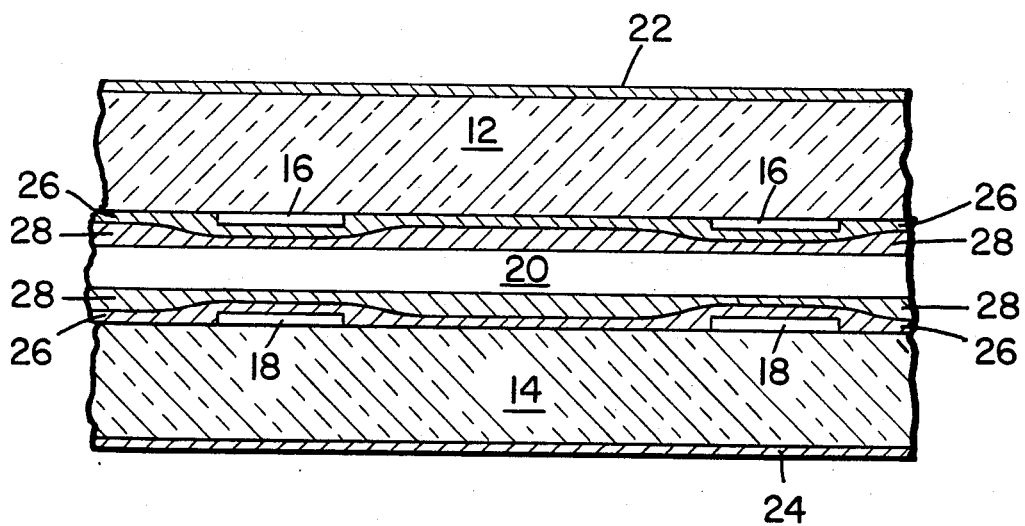
FIG_2

LIQUID CRYSTAL CELL WITH IMPROVED ALIGNMENT

BACKGROUND OF THE INVENTION

This invention relates to liquid crystal display devices and more particularly to such devices that utilize a thin body of twisted nematic liquid crystal material supported between two substrates.

Nematic liquid crystal materials, when in a mesomorphic phase, have the useful property of effecting the direction of polarization of incident linearly polarized light. This property can be modified or altered by the influence of an electrical potential or a magnetic field. As well known in the art, various organic nematic compounds may be formed into thin layers and subjected to an electrical field, the selective application of the field serving to change the light reflective or light transmissive properties of the nematic compounds, thereby making possible various optical display devices. The use of twisted nematic liquid crystal materials have been found to be particularly desirable for optical cells of the so-called field effect type because they require lower voltage, and less power. However, the operation of twisted nematic liquid crystal cells of the field effect type requires the effective homogeneous alignment of the liquid crystal molecules. That is, the relatively long molecules must be constrained to lie in a cooperative orientation, parallel to the inner surfaces of the spaced apart plates of the cell. If two transparent plates are provided each with inner surface characteristics such that the liquid crystal molecules are caused to be oriented in parallel alignment on its own plate but at right angles with respect to the other plate, then the resulting effect will be an optical media which rotates the plane of linear polarization by 90°. Similarly, if the two elongated molecules directions are aligned 45° with respect to each other, the resulting nematic liquid will rotate the plane of linearly polarized light at 45°. Similarly, any amount of optical rotation can be obtained. The liquid crystal material is elastically deformed by intermolecular interaction, such that the long axes of the nematic material are oriented in a helical manner relative to each other between the plates. When an electric field is applied to the device, the structure will untwist at a well defined voltage and allow light transmissions when the device is between parallel polarizers.

In order to achieve the necessary parallel orientation or alignment of molecules on the cell plates, it was necessary in prior devices to modify the transparent plate surfaces by rubbing their inner surfaces unidirectionally to provide an alignment axis and an optic axis in the same direction. Mere clean glass or clean transparent electrode surfaces alone did not secure the desired alignment. Later, another effective means for achieving this molecule alignment of nematic-phase liquid crystal material involved the vacuum deposition of a thin film of silicon monoxide (SiO) at a high angle of incidence on the inner surface of each transparent cell plate. This procedure, now well known in the art, was developed by J. L. Janning and is described in Applied Physics Letter 21, 173 (1972). However, the Janning technique for obtaining alignment was not always successful in all cases, nor did it provide for an alignment that was always uniformly high at the boundaries between a glass surface and the transparent conductive electrode areas on the cell plates. It is believed that the SiO layer did not produce reliable alignment because it did not grow at the same rate and with the same surface texture on the conductive pattern region of the cell plates as it did in the clear glass regions of the plate. In addition, the molecule alignment occurring at the interfaces of conductive and nonconductive regions was either random or in some cases essentially homeotropic using the SiO layer. Such areas would appear as smudges on the display devices the same as regions of normally activated areas. Also, such imperfections often resulted in the appearance of strong first-order optical interference colors or patterns which made it difficult or impossible to view the display.

Another problem which arose relative to the direct application of the SiO layer to the patterned conductive areas on the display plates was that the SiO layer was not impervious to ionic currents which could therefore penetrate it and cause electro-chemical damage to the conductive oxide layer beneath. In extreme cases the SiO layer itself could be damaged by such ionic penetration which would also result in degradation or complete malfunction of the cell.

BRIEF SUMMARY OF THE INVENTION

The aforesaid problems are solved in liquid crystal devices in accordance with the principles of the present invention by first providing plates or substrates of a device constructed in the conventional manner having patterned areas of a layer of transparent conductive material such as indium oxide on the inner surface of each plate. Over the entire inner surface of each electroded cell plate is applied, as by reactive deposition, a thin film of a dielectric layer such as pyrolytic $SiO_2$ commonly referred to as silox. This impervious film covers the conductive areas in such a way that it effectively covers their edges and provides a base of a more uniform texture or consistency for the next layer to be applied. Following this, an angular deposition of a thermally evaporated SiO is applied to each electroded cell plate. In the manner already known in the art the SiO provides a surface characteristic that causes parallel alignment of the liquid crystal molecules. In the conventional field effect liquid crystal cell structure, the plates are joined together around their periphery and spaced apart to form a thin cavity for the liquid crystal material. The alignment so obtained is uniform, strong and free from the interference color patterns which heretofore impeded visibility of such display devices.

Another advantage of the present invention is that the layers $SiO_2$ and SiO in the combination with the conductive oxide provide essentially an interference filter which suppresses reflection of light from and thereby reduces the visibility of the conductive oxide in all regions.

Accordingly, a general object of the present invention is to provide a solution to the aforesaid problems and, more specifically, to provide a field effect liquid crystal cell that produces a reliable homogeneous alignment of the molecules of the liquid crystal material.

Another object of the present invention is to provide an improved liquid crystal cell with reliable and thorough alignment characteristics that is particularly well adapted for ease and economy of manufacture.

Another object of the present invention is to improve the immunity of the cell to electro-chemical damage or degradation including damage to aligning surfaces, electrode surfaces or to the liquid crystal itself.

Other objects, advantages and features of the invention will become readily apparent from the following detailed description which is presented in conjunction with the accompanying drawings.

BRIEF DESCRIPTION OF THE DRAWINGS

FIG. 1 is a front elevation view of a typical liquid crystal cell shown with its digital characters activated; and FIG. 2 is a view in section taken along line 2—2 of FIG. 1 and showing the various layers on the inner surfaces of the cell plates according to the present invention.

DETAILED DESCRIPTION OF THE INVENTION

With reference to the drawing, FIG. 1 shows a liquid crystal optical cell or display device 10 in a configuration adaptable for use in a timepiece such as a wrist watch. This particular device is shown as a typical example as it appears when indicating the time in digital hours and minutes. However, it should be understood that the present invention is applicable to display devices having any suitable plan form configuration and useable for other purposes such as readout displays on digital meters or calculators.

In general, as shown in FIG. 2, the device comprises a pair of plates 12 and 14 of transparent non-conductive material such as clear glass. On the inner surfaces of the plates 12 and 14 are layers 16 and 18 of transparent conductive material such as indium oxide. These latter layers on each plate, are formed with a predetermined pattern of conductive material so that the two plates, when in a predetermined superposition, form readable master characters such as the well known seven segment digital character. Conductive lead portions (not shown) extend from the conductive segments on both plates to terminal pads located along one edge of the device so that the character segments can be energized selectively to provide the desired display.

Now, as shown in FIG. 2, the plates 12 and 14 of the cell 10 are spaced apart a small predetermined distance and are sealed around their edges to form a planar chamber which is filled with a nematic liquid crystal material 20. (Such a material is described in assignee's copending application Ser. No. 503,241, filed Sept. 5, 1974).

In order for this material to function properly in an optical display device of the field effect type, as well known in the art, its elongated molecules must be aligned with the inner surface of the plates when electrical field is present between the conductive layers 16 and 18. The completed display is viewed by placing the plates between linear polarizers 22 or 24 or by applying a linear polarizing material to the outer surface of each plate.

In the present invention the aforesaid alignment of the liquid crystal molecules on each transparent plate is accomplished by providing a first thin film or layer 26 of a transparent dielectric material which extends over the entire inner surface including the conductive layer on each plate. This dielectric material is preferably pyrolytic silicon dioxide $SiO_2$ or "Silox" which can be applied by a simple silane deposition method using conventional equipment. This silox layer is applied to a thickness of around 100 Angstroms and completely covers the entire inner surface of each plate, thereby forming another surface that is more uniform both in chemical compositions and in texture. This $SiO_2$ is essentially impervious to ionic currents and thereby provides a protective barrier over the conductive oxide.

On top of the silox layer 26 on each plate an angular deposition is made of a thermally evaporated silicon monoxide (SiO) to form a thin film 28. This film may be formed by a standard vacuum deposition process and applied at a high angle of incidence (e.g. 80°) relative to the normal to the surface of each cell plate. An effective thickness range for the film 28 is 100 – 500A, although it has been determined that a range of 200 – 300A provides particularly good results. With the silicon dioxide already applied, the angle of incidence of the SiO is essentially uniform over the entire surface of each plate. Thus, the alignment of molecules of the liquid crystal material 20 remains high over the conductive area as well as along the edges thereof and is therefore essentially uniform over the entire inner surface of each plate. Because of this alignment uniformity, clear, well defined character images are formed without optical interference colors or patterns when the device is activated. Also, other visual blemishes are significantly reduced or eliminated and the operating life time of the cell is extended.

The surface aligning film 28 may be formed from materials other than silicon monoxide. For example, orientable films may be used such as those produced from linear polymer or alkoxy silane derivatives. An example of a suitable linear polymer is polyvinyl alcohol, and an example of an alkoxy silane derivative is one made by Dow Corning, designated XZ- 2024. Such an aligning film may be applied out of a solvent solution (e.g. 2 percent polyvinyl alcohol in water or a 0.1 percent aqueous solution by volume of alkoxy silane derivative) and oriented either by rubbing during solvent removal or after solvent removal.

An important factor insofar as the present invention is concerned is that the initial dielectric layer 26 is applied between the patterned conductive layer and the alignment film, thereby making the latter more effective. The deposition of the dielectric layer 26 significantly improves the viewing angle of the display, and enhances the tendency for the liquid crystal molecules to align in a single-domain homogeneous orientation, as opposed to the 180° domain texture which occurs frequently in devices which lack this dielectric layer.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. An optical display device comprising a pair of transparent plates that are spaced apart and sealed peripherally to form a thin planar cavity filled with a twisted nematic liquid crystal material;

a first layer of transparent conductive material forming an electrode in a preselected pattern configuration on the inner surface of each said plate;

a first thin film of dielectric material covering the inner surface and said conductive pattern configuration on each said plate said first film having substantially the same thickness over the entire conductive pattern and forming a second layer having a surface that is more uniform in chemical composition and texture than said inner surface of the plate and its said first layer of conductive material thereon;

and a second thin film of aligning material of uniform thickness covering said second layer on each said plate and causing the molecules of said liquid crystal material to be aligned essentially parallel to each other on the surface of each plate.

2. The liquid crystal device of claim 1 wherein said second film on each said plate is silicon monoxide.

3. The liquid crystal device of claim 2 wherein said first film on each said plate is silicon dioxide.

4. The liquid crystal device of claim 1 wherein said first film has a thickness of around 100 Angstroms and said second film has a thickness in the range of 200 – 300 Angstroms.

* * * * *